March 8, 1932.  G. W. DAVEY  1,848,110

FURNACE WALL

Filed March 18, 1926  4 Sheets-Sheet 1

George W. Davey
INVENTOR

BY
Charles A. Clark.
ATTORNEY

March 8, 1932.  G. W. DAVEY  1,848,110
FURNACE WALL
Filed March 18, 1926  4 Sheets-Sheet 2

George W. Davey
INVENTOR

BY
Charles A. Clark.
ATTORNEY

March 8, 1932.　　　G. W. DAVEY　　　1,848,110
FURNACE WALL
Filed March 18, 1926　　　4 Sheets-Sheet 4

George W. Davey
INVENTOR

BY
Charles A. Clark
ATTORNEY

Patented Mar. 8, 1932

1,848,110

UNITED STATES PATENT OFFICE

GEORGE W. DAVEY, OF LONG ISLAND CITY, NEW YORK

FURNACE WALL

Application filed March 18, 1926. Serial No. 95,686.

My invention relates to furnace walls which are subject to high temperatures and is more particularly concerned with furnaces burning powdered coal, its equivalent, or oil as a fuel.

One object of my invention is to provide a wall which can be repaired while the fire is on or without shutting down the boiler.

Another object of my invention is to provide a furnace wall, the hottest and most wearable part of which consists of a rotatable air cooled panel or group of panels.

A still further object of my invention resides in the unique construction of the rotatable panels whereby either a part or the whole of the furnace wall subject to disintegration or under fire can be conveniently and quickly removed and immediately replaced by a new wall.

Other valuable features, hereinafter pointed out and described, are illustrated in the accompanying drawings, wherein similar numerals refer to like parts throughout the several views, in which:—

Figure 1:
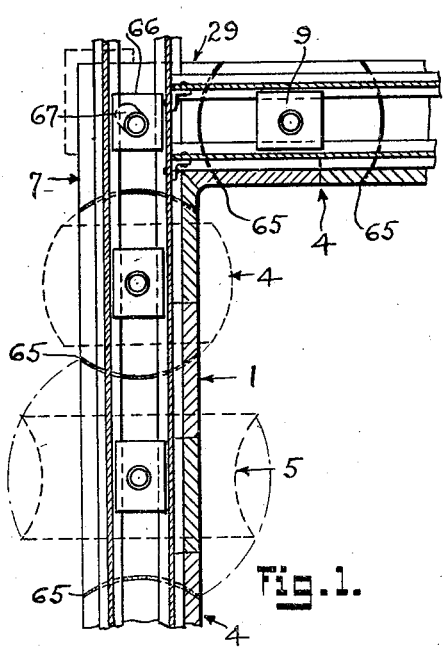
Figure 1 is a plan in section of one form of wall taken on line 1—1 in Figure 3.
Figure 3:
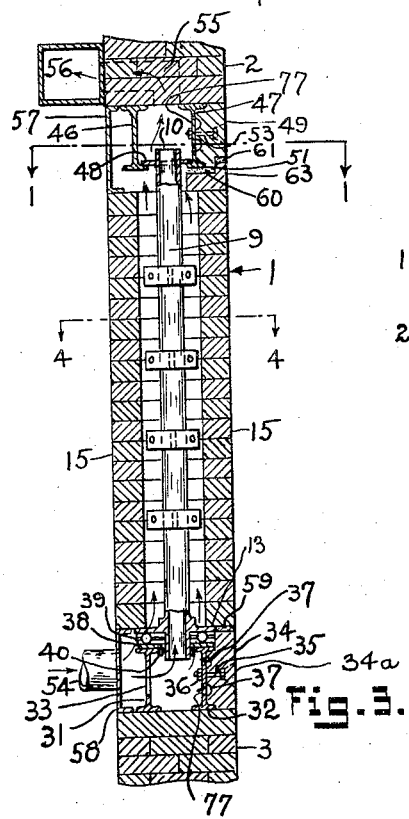
Figure 3 is a vertical section taken through the panel.

The furnace wall 1, shown in Figures 1 and 3, has an upper portion 2, built up of masonry and a lower portion 3, also built up of masonry.

Between these parts 2 and 3, at a point in the furnace where the walls are subjected to the greatest heat, are located the rotatable panels, 4 and 5, shown in Figure 1.

In order to rotate these panels the corners 7, in Figure 1, are movable diagonally and when moved will allow the panels 4 and 5 to be revolved to present a new face of the air cooled refractories to the fire.

Figure 2:
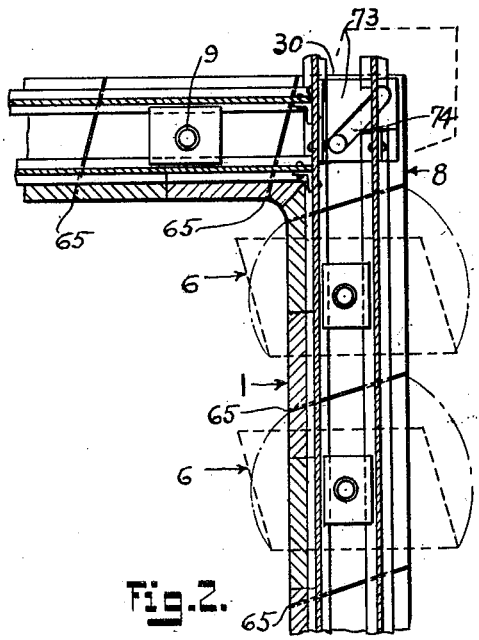
Figure 2 is a plan in section of another form of wall.

The panels 6 of Fig. 2 (illustrated in cross section in Fig. 5) although of a modified form, are similarly rotatable upon moving the furnace wall corners 8 diagonally outward.

The several panels of the types shown in Figures 1, 2, 4 and 5, are each built up upon a skeleton frame 9, which consists primarily of a hollow tube 10, provided with a multiplicity of duplicate and opposite T shaped arms 11, which may be integral with the tube and arranged in spaced relation along its length, each T shaped arm having two bolt holes 12 therein.

Near the lower end of this tube 10, is a plate extension 13, which is provided with the air holes 14.

The panels are built up of a series of interlocking highly refractory brick or shapes which may be of the curved type as shown in Figures 1, 4, 6, 13, 15 and 16, or of the angular type as shown in Figures 2, 5, 8 and 9, together with angular side blocks shown in Figs. 4, 5, 7 and 15.

The panel of the curved type of block consists primarily of a plurality of reversible side pieces 15, and a plurality of reversible corner pieces 16, which are supported on the plate 13 and held in interlocking position to the frame 9.

A group of corner parts 16, are placed between two rounded strips 17 and 18, clamped by the clamps 19 and 20, together with the bolts 21 and held by the bolts 23.

Figure 4:
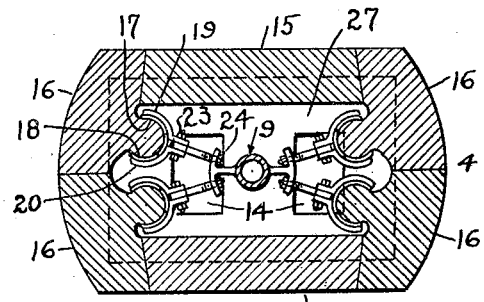
Figure 4 is an enlarged cross section through one panel of the wall shown in Figures 1 and 3.

This group of parts is held to the frame 9, by the nuts 24, which when drawn up clamp the parts 15 and 16 firmly together as clearly shown in Figures 3 and 4.

Figure 5:
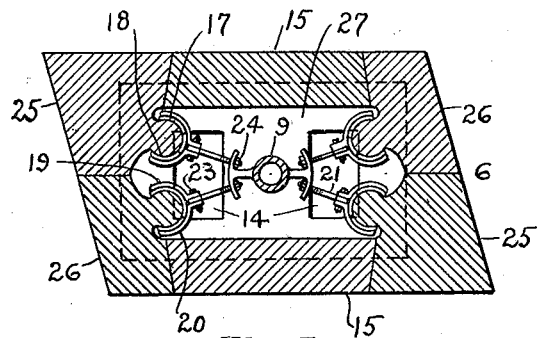
Figure 5 is a cross section similar to Figure 4 except that it is taken through a panel of the form shown in Figure 2.
Figure 6:
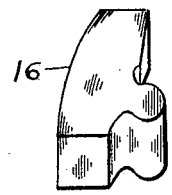
Figure 6 is an isometric view of one of the interlocking blocks shown in Figure 4.
Figure 7:
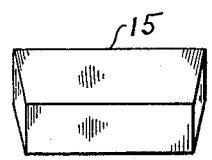
Figure 7 is an isometric view of a typical center block common to both types or forms shown in Figures 4 and 5.
Figure 8:
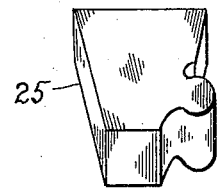
Figure 8 is an isometric view of one of the interlocking blocks shown in Figure 5.
Figure 9:
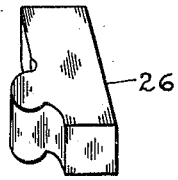
Figure 9 is an isometric view of another of the interlocking blocks shown in Figure 5.

In Figure 5, the reversible corner parts 25 and 26 and the side piece 15 are clamped together in substantially the same manner, both types of panels having a central air space 27.

The other form of panel 5, (see Figs. 1 and 15), is of a construction similar to the panels 4 and 6, except that it is built up of the reversible corner parts 28, and side parts 15, and as shown in Fig. 1 this type of panel co-operates with panel 4.

The corner portions 7 and 8, of the walls, shown respectively in Figures 1 and 2, are built up of a multiplicity of specially shaped invertible refractory parts 29 and 30. (see Figs. 17 and 18), which co-operate with the panels 4 and 6 as shown in Figures 1 and 2.

The panels 4, 5 and 6, are supported by I beams 31 and 32, in the lower wall 3, the outer beam 31 being provided with air openings 33, while the inner beam 32, is provided with bolt holes to hold the air cooled filler blocks 34, and air holes 77.

These filler blocks 34, have cooling channels 37, facing the I beam 32, and communicating with the air holes 77.

The bolts 35, countersunk in the block 34, hold the block to the I beam 32 by the nuts 36, and the countersunk hole in the block may be afterward filled with any suitable plastic fireclay, as indicated at 34a in Fig. 3.

The panels 4, 5 and 6 are supported upon the I beams 31 and 32, by a plate 38, which has a hole therein fitting over the lower end of the frame 9 and this plate also has positioning pins 40, holding the plate from moving transversely of the wall but allowing it to move longitudinally thereof.

Figure 11:
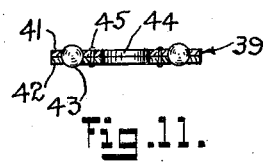
Figure 11 is an enlarged cross sectional view of the ball bearing shown in Figure 3.
Figure 12:
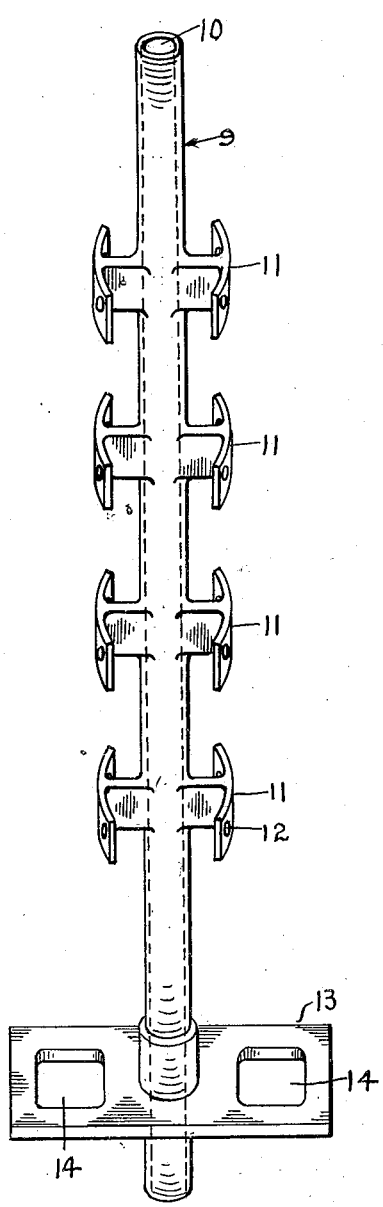
Figure 12 is an isometric view of the panel support employed in the wall.
Figure 13:
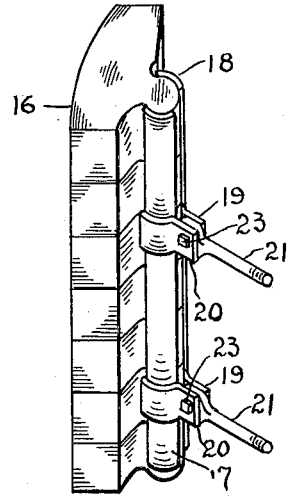
Figure 13 is an isometric view illustrating how a series of interlocking corner blocks are held to the support shown in Figures 3 and 12.

Between this plate 38 and the plate extension 13 of the frame 9, is a bearing 39, as clearly shown in Figures 3 and 11.

The balls 43, of this bearing 39, are held in position by the two plates 41 and 42 and the rivets 45, the hole 44 of the bearing fitting closely over the lower end of the tube 10.

The upper wall 2, is held in position by the I beams 46 and 47, which also serve as guides and supports for the pivot plates 48, fitting over the end of the tube 10, said pivot plates being slidable between the I beams longitudinally of the wall.

Figure 10:
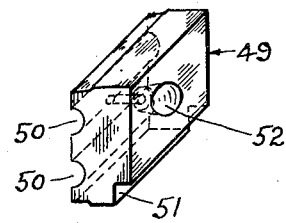
Figure 10 is an isometric view of a typical air cooled, vertical expansion blocks, as shown in Figure 3, which is adapted to be bolted in place.

The I beam 47, carries expansion blocks 49, (see Fig. 10), provided with air grooves 50, slip joint 51 and countersunk bolt holes 52, each block being held in position on the I beam by the bolt and nut 53 (see Fig. 3).

Figure 14:
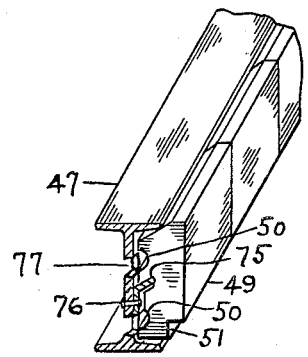
Figure 14 is an isometric view of a modified form of air cooled vertical expansion block which slides into place.
Figure 15:
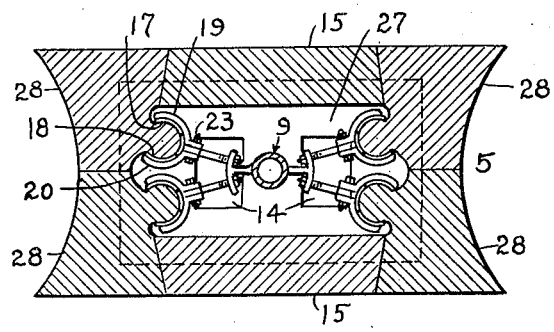
Fig. 15 is a view similar to Fig. 4, illustrating in cross-section a panel from the wall of Fig. 1 which co-operates with the form of panel illustrated in Fig. 4.
Figure 16:
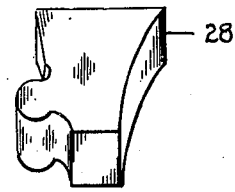
Figure 16 is an isometric view of one of the corner blocks shown in Figure 15.

Figure 14 illustrates a form of expansion block that slips into place over an angle 75, held to the I beam 47 by the rivets 76, said block having air channels 50 which communicate with the holes 77 in the beam 47 in a way similar to the type shown in Figure 3.

Figure 20:
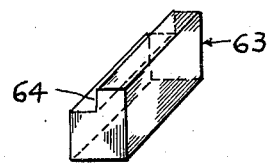
Figure 20 is an isometric view of an expansion block shown in Figure 3.

When either panel 4, 5 or 6 is in place the space over the panel is closed with the expansion block or blocks 63, shown in Figure 20, the sliding surface 64 engaging the sliding face 51 of the block 49.

The panels 4, 5 and 6, are rotatable as shown by the dotted lines in Figures 1 and 2, and when moved into the closed position are sealed in gas tight unity by insertion of the block 63, and the spaces under the panel, shown by 59, and over the panel by 60 and 61, are filled with asbestos or mineral wool, as well as the spaces between the panels indicated by 65. Access to the blocks 63 to hold them in position when rotating the panels, or to renew the asbestos or mineral wool used in conjunction therewith, may be had by removal of the air duct closure plate 57 hereinafter further referred to.

In Figure 1, the corner piece 7, is supported in a way similar to that hereinbefore described for Figure 3, except that the upper plate 66 has a slot 67, to allow the corner piece to be moved as shown by the dotted lines in Figure 1.

Figure 17:
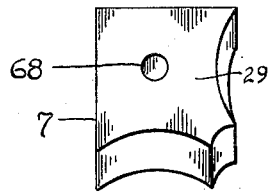
Figure 17 is an isometric view of a furnace corner block, as shown in Figure 1.
Figure 18:
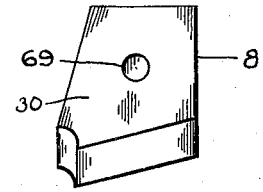
Figure 18 is an isometric view of a furnace corner block, as shown in Figure 2.
Figure 19:
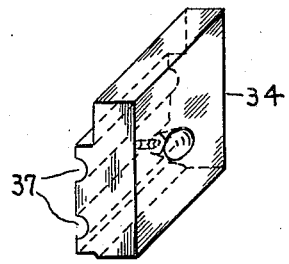
Figure 19 is an isometric view of an air cooled filler block used under the panels.
Figure 21:
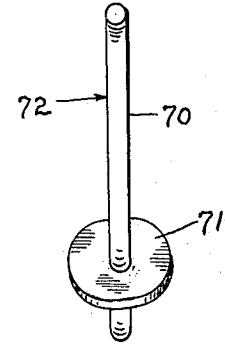
Figure 21 shows one form of support for the corner blocks of the furnace.

The corner blocks 7, as shown in Figure 17, are provided with a hole 68, through which passes the tube 70 of the support piece 72, shown in Fig. 21.

The corner blocks are superimposed upon the tube 70 and rest upon the tube extension 71.

In Figure 2, the corner piece 8, is of a different shape, moves to a position shown by the dotted lines and has an upper plate 73, with a slot 74, otherwise being the same as 7.

In revolving the panels to change a worn out face for a new one, the corners are first moved and the panels may be moved or forced to move horizontally in parallelism with the wall enough to break the seal, then revolved placing the new face to the fire.

All the panels are air cooled and may be cooled either by forced draft, induced draft or natural draft.

When the panels are closed, the plate 57 is placed in position as shown in Figure 3, and the plate 58 with one or more air inlets 54, is also positioned under the panels.

The air enters through the inlets 54, passes between the I beams 31 and 32, enters the tube 10, and the openings 14, between the tube and blocks, passes upwardly cooling the blocks and preheating the air, enters the flue 55, in the wall 2, and finally passes into the manifold 56.

It is obvious that the whole wall of the furnace could be made as one panel and revoluble around a vertical axis or around a horizontal axis, if preferred, or that a plurality of vertically revoluble panels might be utilized as shown in Figures 1 and 2, or a plurality of horizontally revoluble panels used with equal facility.

Having thus described and illustrated the preferred embodiment of my invention I do not desire to limit myself to the exact construction shown except so far as the same may be specifically claimed, since it is evident that modifications may be made without departing from the spirit of the invention or scope of the claims.

I claim:—

1. In a furnace wall a revoluble panel having a plurality of refractory faces one of which is positioned at the outside of the wall when another is upon the inside and vice versa.

2. In a furnace wall a revolubly reversible panel having a plurality of oppositely-disposed refractory faces one of which is positioned at the outside of the wall when another is upon the inside.

3. In a furnace wall a revoluble panel having a plurality of refractory faces and cooling means therefor one of said faces being positioned at the outside of the wall when another is upon the inside and vice versa.

4. In a furnace wall a revoluble panel having a plurality of refractory faces and cooling means therefor disposed within the panel between said faces.

5. In a furnace wall a revoluble panel having a plurality of oppositely-disposed refractory faces, a pair of them being in parallel planes, with cooling means between them.

6. A reversible furnace wall section built up of refractories and having a substantially centrally positioned axis member extending in a plane parallel the plane of the wall section.

7. A reversible furnace wall panel built up of refractories and having an axis member lying longitudinally therein with securing means holding said refractories thereto.

8. A reversible furnace wall panel built up of refractories and having an internal supporting and axis member, together with air passage means, for circulating air, inside the panel.

9. A reversible furnace wall panel built up of refractories and having an internal supporting and axis member, together with means whereby air may be circulated through said axis member.

10. A furnace wall section having a plurality of refractory faces, one of which is at the outside of the wall when an opposite face is upon the inside, and mounted on a bearing for movement to present either face to the fire.

11. A furnace wall section having a plurality of alternatively utilizable refractory faces in different planes, a supporting structure within the section, and bearing means on which said supporting structure is movably mounted.

12. In a reversible furnace wall panel of the character described, a supporting structure, refractories secured thereto, and other refractories held by said secured refractories.

13. In a reversible furnace wall panel of the character described, a supporting structure, refractories secured thereto, and other refractories held by said secured refractories and co-operating therewith to form wall faces.

14. A furnace wall having a fixed portion, and a plurality of sections, reversible on axes lying in the plane of the wall, co-operating therewith and with each other to present an uninterrupted face inside the furnace when each of said sections is in either of its positions.

15. In a furnace wall construction, movable corner refractories, a plurality of revoluble refractory wall panels mounted on axes lying in the plane of the wall, and releasable locking means for the latter including said movable corner refractories.

16. In a furnace wall construction the combination of reversible wall sections mounted on axes lying in the plane of the wall and co-operating corner wall portions movable diagonally of the furnace to permit reversal of the sections.

17. In a furnace wall construction the combination of reversibly mounted wall sections engaging each other to present a substantially uninterrupted face inside the furnace with said sections in either of their positions.

18. In a furnace wall construction the combination of reversible interengaging sections, and corner wall refractories engaging the sections adjacent thereto and movable to permit reversal thereof.

19. In a furnace wall construction, a plurality of revolubly reversible refractory panels, and releasable locking means therefor including interengaging portions on adjacent panels.

20. A furnace wall construction comprising a plurality of interengaging panels each reversible on an axis of its own, the engaging sides of each alternate panel being cylindrical.

21. A furnace wall construction comprising a plurality of interengaging panels each reversible on an axis of its own, the engaging sides of each alternate panel being cylindrical, and the co-operating sides of each of the other panels being recessed to co-operate with said curved sides.

22. A furnace wall construction comprising a plurality of interengaging panels each reversible on an axis of its own, the engaging sides of each alternate panel being outwardly curved on a radius drawn from the axis of the panel, and the engaging sides of each of the other panels being correspondingly inwardly curved.

Signed at Jackson Heights in the county of Queens and State of New York this 17th day of March A. D. 1926.

GEORGE W. DAVEY.